United States Patent
Ansari et al.

(10) Patent No.: US 9,847,934 B2
(45) Date of Patent: Dec. 19, 2017

(54) REDUCING PACKET REORDERING IN FLOW-BASED NETWORKS

(71) Applicants: Shad I. Ansari, San Jose, CA (US); Srinivasa R. Addepalli, San Jose, CA (US)

(72) Inventors: Shad I. Ansari, San Jose, CA (US); Srinivasa R. Addepalli, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 553 days.

(21) Appl. No.: 14/481,277

(22) Filed: Sep. 9, 2014

(65) Prior Publication Data
US 2016/0072717 A1   Mar. 10, 2016

(51) Int. Cl.
*H04L 12/717* (2013.01)
*H04L 12/707* (2013.01)
*H04L 12/721* (2013.01)
*H04L 12/715* (2013.01)

(52) U.S. Cl.
CPC .............. *H04L 45/42* (2013.01); *H04L 45/24* (2013.01); *H04L 45/38* (2013.01); *H04L 45/64* (2013.01)

(58) Field of Classification Search
CPC ....... H04L 5/38; H04L 29/0653; H04L 45/56; H04L 45/7457; H04L 45/42
See application file for complete search history.

(56) References Cited

U.S. PATENT DOCUMENTS

| | | | | |
|---|---|---|---|---|
| 2011/0317559 A1* | 12/2011 | Kern | ................ | H04L 45/02 370/235 |
| 2013/0163602 A1* | 6/2013 | Kang | ................ | H04L 12/56 370/400 |
| 2016/0330113 A1* | 11/2016 | Chiba | ................ | H04L 45/38 |

OTHER PUBLICATIONS

Mitt, Buffering Approach discussion, email from Joji Mitt, http://www.mail-archive.com/discuss@openvswitch.org/msg03388.html, dated Apr. 25, 2012, pp. 1-2.
(Continued)

*Primary Examiner* — Noel Beharry
*Assistant Examiner* — Mandish Randhawa

(57) ABSTRACT

The present disclosure provides for methods, network devices, and computer readable storage media for packet reordering. In one embodiment, a method includes receiving a first packet of a first flow at a network device and determining whether flow-identifying information extracted from the first packet matches an existing flow entry. The method also includes, in response to a determination that the flow-identifying information does not match any existing flow entries, generating a new transient flow entry that includes the flow-identifying information and packet-in state. The method also includes forwarding the first packet to a controller via a packet-in stream.

20 Claims, 15 Drawing Sheets

(56) References Cited

OTHER PUBLICATIONS

Fleytman, Buffering Approach discussion, email from Dmitry Fleytman, http://openvswitch.org/pipermail/discuss/2013-October/011437.html, dated Oct. 2, 2013, pp. 1-6.

Meitinger, A Hardware Packet Re-Sequencer Unit for Network Processors, Technische Universitat Munchen, ARCS 2008, Dresden, pp. 1-17.

Traboulsi, An Efficient Hardware Architecture for Packet Re-sequencing in Network Processors MPSoCs, Digital System Design, Architectures, Methods and Tools, 2009, DSD '09, 12th Euromicro Conference, Aug. 27-29, 2009, pp. 11-18.

Wu, A Practical Reordering Mechanism with Flow Granularity for Parallelism Exploiting in Network Processors, Parallel and Distributed Processing Symposium, 2005, Proceedings, 19th IEEE International, Apr. 4-8, 2005, 8 pages.

\* cited by examiner

REDUCING PACKET REORDERING IN FLOW-BASED NETWORKS

BACKGROUND

Field

This disclosure relates generally to networks, and more specifically, to packet reordering in networks.

Related Art

Data packets are often sent from a source to a destination via a path through a network. A number of paths may be available between the source and destination, where each path includes one or more network devices that are each configured to send the data packets based on information that describes the various paths in the network. It is generally important to maintain the original packet order of the data packets, to ensure that the destination is able to properly process the data packets.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Figure 1:
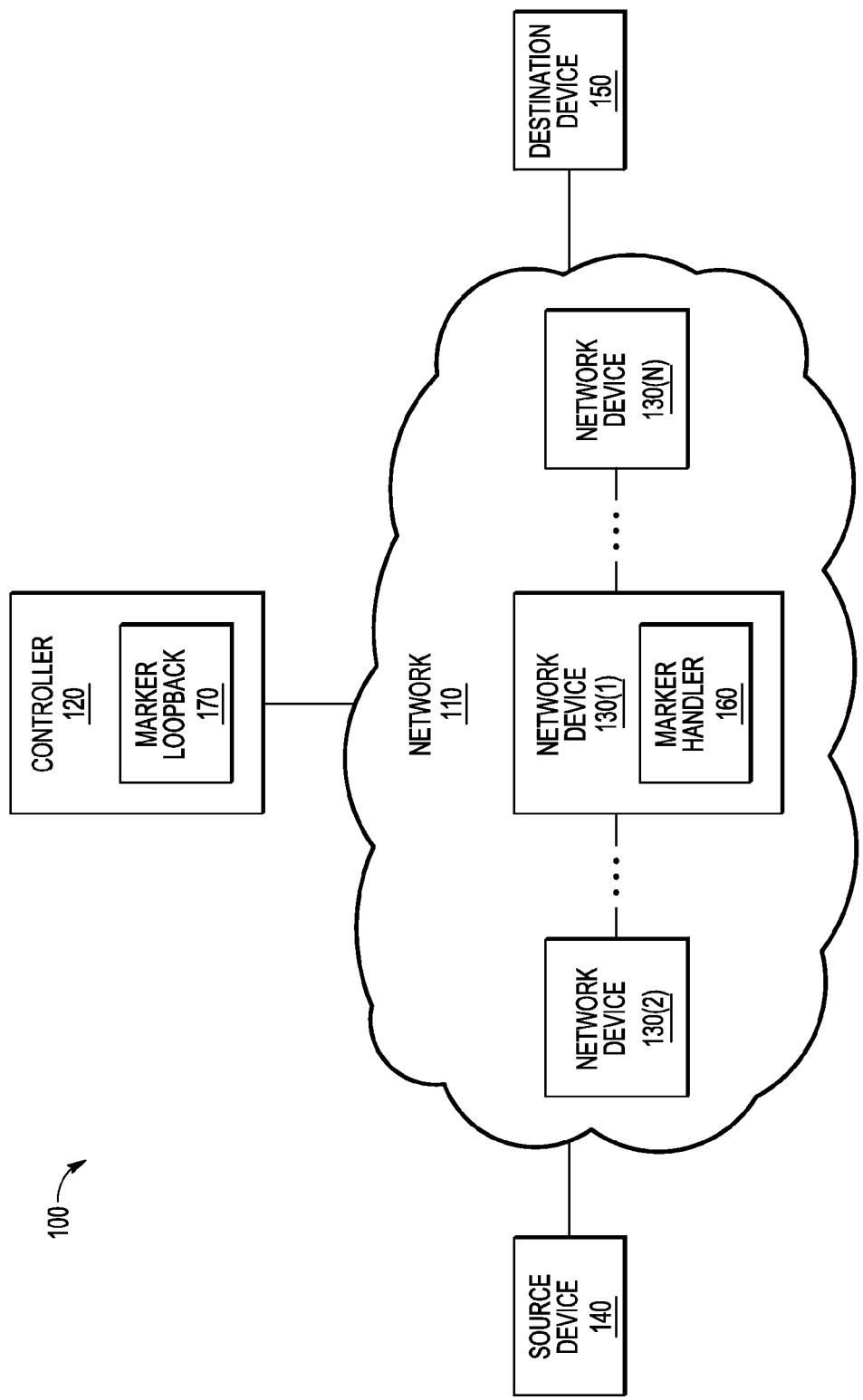
FIG. 1 illustrates a block diagram depicting an example system in which the disclosure is implemented, according to some embodiments.

FIG. 1 illustrates a block diagram depicting an example system 100 in which the disclosure is implemented. System 100 includes a network 110 and a controller 120 coupled to network 110. Network 110 includes a plurality of network devices 130(1)-(N) that are configured to communicate with controller 120. Network device 130(1)-(N) and controller 120 are enabled with a flow-based protocol (such as a software-defined network (SDN) protocol or a network function virtualization (NFV) protocol), which is a communications protocol that separates the forwarding plane and control plane of network 110.

Network devices 130(1)-(N) are each configured to implement forwarding plane functions, such as forwarding data packets toward a destination along a data path in network 110. Each data path is defined in a flow policy, where each flow policy is stored in an entry of one or more flow tables, which in turn are stored locally on network devices 130(1)-(N). Examples of a network device 130 include, but are not limited to, a routing device, a switching device, a computing device, and the like. An example network device is further discussed below in connection with FIGS. 10 and 11A-11B.

Controller 120 is configured to implement centralized control plane functions, such as determining the data paths for data packets to follow through network 110 and installing flow policies that define the data paths into local flow tables on network devices 130(1)-(N). Examples of a controller 120 include, but are not limited to, a server, a network device (as further discussed below in connection with FIGS. 10 and 11A-B), a computing device, and the like. Examples of network 110 include, but are not limited to, an Internet Protocol (IP) network, an Ethernet network, a local area network (LAN), a wide area network (WAN), and the like.

System 100 also includes a source device 140 and a destination device 150 coupled to network 110. Source device 140 is configured to transmit content in the form of data packets (or more simply, packets) to destination device 150 over network 110. When a stream of packets (also referred to as a packet flow or more simply, flow) is received by a network device 130, network device 130 checks local flow tables to determine whether a flow policy has been defined for the flow (e.g., performs a lookup for a matching flow policy stored in the flow tables using the source and destination addresses of the received packets). If a flow policy has not been defined for the flow, network device 130 identifies the received packets as initial packets of a new flow and begins forwarding the new flow packets to controller 120 for flow policy evaluation.

Controller 120 evaluates the new flow packets, determines a data path for the new flow, and installs a flow policy defining the data path on network device 130. Meanwhile, network device 130 continues to receive packets of the new flow, which network device 130 continues to forward to controller 120 as a packet-in stream until controller 120 installs the flow policy on network device 130. Once controller 120 has installed the flow policy, controller 120 returns the received packet-in stream back to network device 130 as a packet-out stream (e.g., returns the packets received from network device 130). Also, once controller 120 has installed the flow policy, network device 130 finds the installed flow policy when checking local flow tables for a matching flow policy for packets that are received subsequent to installation of the flow policy. In response, network device 130 stops forwarding such subsequently received packets to controller 120.

Conventionally, once network device 130 finds the installed flow policy, network device 130 begins processing the subsequently received packets according to the installed flow policy. When network device 130 receives the returned packets from controller 120, network device 130 performs packet reordering to process and reassemble the returned packets into order with other packets of the new flow that were received and processed after controller 120 installed the new flow policy for the new flow on network device 130. In such a scenario, network device 130 maintains internal or local parallelism by preventing the forwarding of packets that are out of order.

Packet reordering often takes a significant amount of time to complete, especially when a significant number of packets are forwarded to and returned by the controller. While packet ordering is a key quality of service (QoS) metric used in packet networks, maintaining packet ordering (by performing packet reordering of packets that are out of order) in flow-based networks is problematic for a variety of reasons. For example, increased latencies (or hops) between datapath devices (e.g., network devices 130) and a controller (e.g., controller 120) also increases the amount of time required to complete packet reordering. Also, "simple" datapath devices often have limited buffering resources, which can quickly become overwhelmed when reordering packets of a large number of flows. Finally, controller applications on network services layers 4 through 7 (L4-L7) often require inspection of more than just the first packet of a flow (e.g., require a significant number of packets), indicating that the time to complete packet reordering cannot be minimized by simply limiting the number of packets transmitted to the controller. In some cases, packet reordering that takes an excessive amount of time to complete can also lead to performance degradation as a result of packet retransmission due to reordering (e.g., source device infers that a packet has been lost and retransmits the packet).

The present disclosure provides for a scheme that reduces packet reordering during flow setup (e.g., when initial packets of a new flow are received, as discussed above) by ensuring that the initial packets (e.g., new flow packets received by network device 130 before installation of flow policy) returned to the network device from the controller are processed before subsequently received packets (e.g., new flow packets received by network device 130 after installation of flow policy). Each network device 130 is configured to implement marker handler module 160. Once a flow policy has been installed on a network device 130, marker handler 160 is configured to generate and transmit a marker packet that indicates an end to the packet-in stream sent to controller 120 (e.g., the marker packet notifies controller 120 that no other packets of the new flow will be received after the marker packet is received).

Controller 120 is also configured to implement marker loopback module 170, which is configured to receive a marker packet for a packet-in stream of a new flow from a network device and send a returning marker packet for a packet-out stream to the network device, marking the end of the packet-out stream (e.g., the returning marker packet notifies network device 130 that no other returning packets of the new flow will be received after the returning marker packet is received). Marker handler 160 is configured to use the returning marker packet to merge the returned packet-out stream into an ongoing stream of subsequently received packets of the new flow. Marker handler 160 and marker loopback 170 are further discussed below in connection with FIG. 2. Communication between marker handler module 160 and marker loopback module 170 is further discussed below in connection with FIG. 3A-3E.

Figure 2:
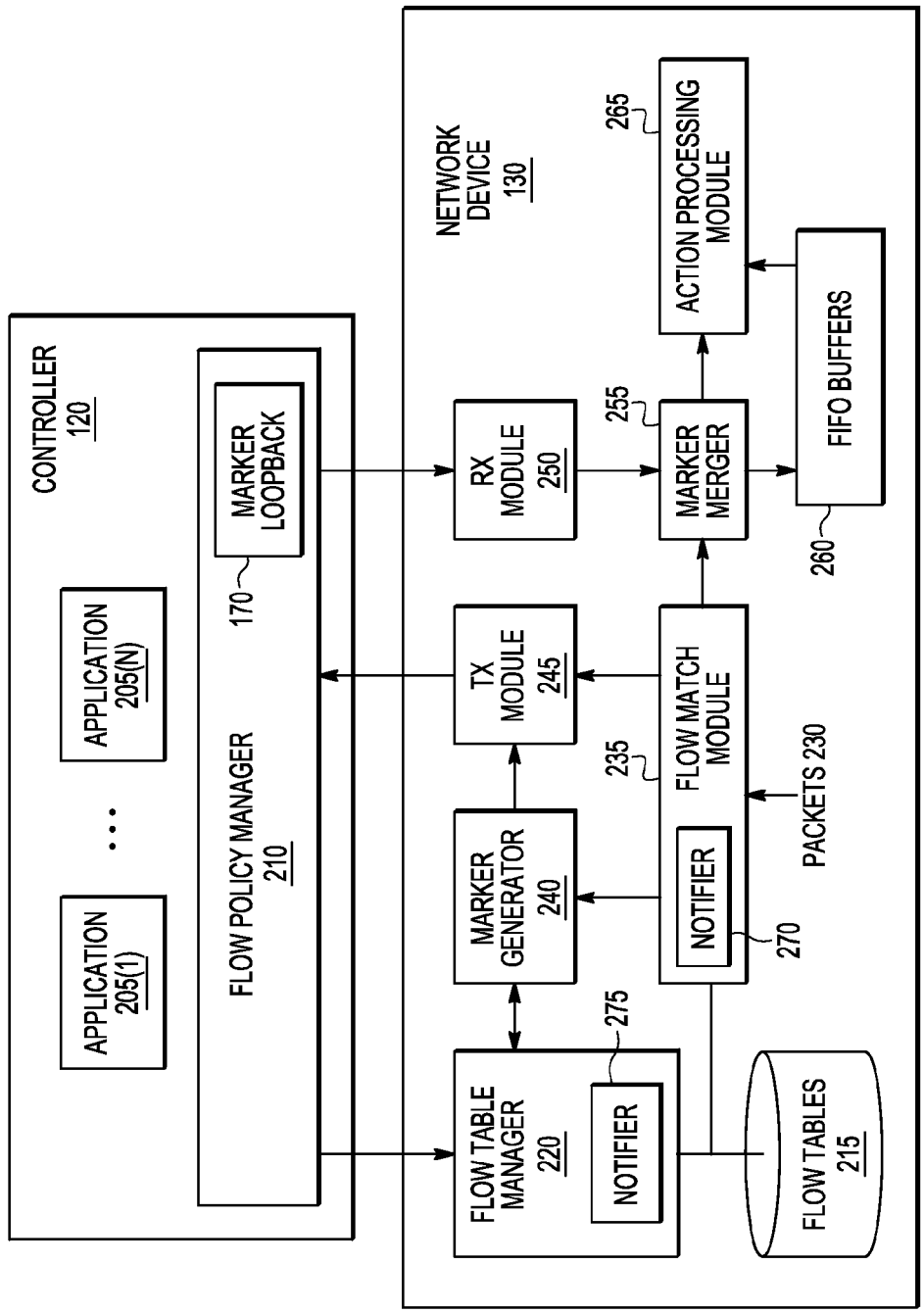
FIG. 2 illustrates a block diagram depicting relevant components of an example network device and an example controller in which the disclosure is implemented, according to some embodiments.

FIG. 2 illustrates a block diagram depicting relevant components of an example network device 130 and an example controller 120. Network device 130 is configured to implement a flow-based packet forwarding mechanism that includes flow match module 235, action processing module 265, flow table manager 220, and one or more flow tables stored in flow table storage 215. Network device 130 is also configured to implement marker handler 160, which includes additional logic for flow match module 235 (not shown), marker generator 240, marker merger 255, notifier 270, notifier 275, and one or more FIFO (first in first out register) buffers 260. Components of marker handler 160 are additive to the flow-based packet forwarding mechanism.

Flow match module 235 is configured to find matching flow policies for packets 230 received from other network devices 130. Existing flow policies are stored in one or more flow tables in flow table storage 215, which is a storage area on one or more storage devices local to network device 130. Additional logic for flow match module 235 (not shown) is included to enable flow match module 235 to search for transient and non-transient flow entries in the one or more flow tables in flow table storage 215, as well as in a transient table, if present. The additional logic for flow match module 235 also enables flow match module 235 to properly forward packets to various components on network device 130 as well as to flow policy manager 210, based on the status (or state) indicated by the transient and non-transient flow entries, as further discussed below.

Marker handler 160 includes notifier 270 that is configured to communicate with flow match module 235 and to detect when flow match module 235 fails to find a matching flow policy for a packet. Notifier 270 is also configured to notify marker generator 240 in response to such detection, indicating that the packet is part of a new flow. In response to the notification by notifier 270, marker generator 240 is configured to generate a transient flow entry for the new flow, indicating that the new flow is in a packet-in state. Packet-in state indicates that a flow policy has not yet been locally installed for the new flow and that packets of the new flow are presently being transmitted to controller 120 as a packet-in stream. In some embodiments, marker generator 240 is configured to communicate with flow table manager 220 to store the transient flow entry in a flow table in flow table storage 215. In other embodiments, marker generator 240 is configured to store the transient flow entry in a transient table, which may be stored in flow table storage 215 or in another storage area, such as a transient storage area.

Flow table manager 220 is configured to update the one or more flow tables with flow policies received from controller 120 (e.g., installs a new flow policy in the flow tables). Marker handler 160 also includes notifier 275 that is configured to communicate with flow table manager 220 and to detect when flow table manager 220 installs a new flow policy (for the new flow) in flow table storage 215. Notifier 275 is also configured to notify marker generator 240 in response to such detection, indicating that the new flow now has an installed flow policy. In response to the notification by notifier 275, marker generator 240 is configured to generate a marker packet for the new flow and to insert the marker packet at the end of the packet-in stream to controller 120, indicating that the new flow is in a packet-out state. Packet-out state indicates that packets of the new flow no longer need to be transmitted to controller 120 and that a packet-out stream is presently being returned to network device 130 (e.g., controller 120 is returning packet-in stream received from network device 130). In some embodiments, marker generator 240 is configured to update the transient flow entry for the new flow to indicate that the new flow is in the packet-out state.

Marker merger 255 is configured to receive the packet-out stream and to forward the packets of the packet-out stream to action processing module 265 (also referred to as simply an action module 265). Action module 265 is configured to process each packet according to the installed flow policy (e.g., performs an appropriate action that is associated with the installed flow policy). Marker merger 255 is also configured to receive packets of the new flow that were received at network device 130 subsequent to installation of the flow policy and to forward those subsequently received packets to FIFO buffer 260. FIFO buffer 260 includes a memory space, such as a number of FIFO registers or other volatile memory space, which is configured to store the subsequently received packets. Marker merger 255 is also configured to receive a marker packet from controller 120 and to flush FIFO buffer 260 to output the stored packets to action module 265 in response to receipt of the marker packet.

Also in response to receipt of the marker packet, marker merger 255 is configured to remove the transient flow entry for the new flow, indicating that the new flow is in a normal processing state (e.g., no longer in packet-in state or packet-out state). In some embodiments, marker merger 255 is configured to communicate with flow table manager 220, with marker generator 240 (where marker generator 240 may communicate with flow table manager 220), or with both, to remove the transient flow entry stored in a flow table in flow table storage 215 by removing or clearing transient status of the transient flow entry. In other embodiments, marker merger 255 is configured to remove or delete the transient flow entry from the transient table, which is stored in flow table storage 215 or in another storage area, such as a transient storage area.

Network device 130 also includes a transmit (TX) module 245 configured to transmit packets from one or more ports of network device 130 that are coupled to network 110. Flow match module 235 is configured to send new flow packets in a packet-in stream to controller 120, such as by encapsulating the packets with address information indicating the packet's destination is controller 120, and to internally route the encapsulated packet to TX module 245, which transmits the encapsulated packet toward controller 120. Marker generator 240 is configured to internally route a marker packet (which may be encapsulated with address information indicating the marker packet's destination is controller 120) to TX module 245, which transmits the marker packet toward controller 120. Network device 130 also includes a receiver (RX) module 250 configured to receive packets from one or more ports of network device 130 that are coupled to network 110. RX module 250 is configured to internally route packets received from controller 120 (e.g., packets of the packet-out stream and marker packets) to marker merger 255 and to internally route packets received from other network devices 130 to flow match module 235. RX module 250 is also configured to internally route flow policy received from controller 120 to flow table manager 220.

Controller 120 is configured to implement a flow-based packet control mechanism that includes flow policy manager 210. Controller 120 is also configured to implement one or more applications 205(1)-(N) configured to support end-to-end communication between source device 140 and destination device 150, a TX module (not shown) configured to transmit packets from one or more ports of controller 120 that are coupled to network 110, and an RX module (not shown) configured to receive packets from one or more ports of controller 120 that are coupled to network 110, and to internally route packets received from network devices 130(1)-(N) to flow policy manager 210. Controller 120 is also configured to implement marker loopback module 170, which is additive to the flow-based packet control mechanism.

Flow policy manager 210 is configured to evaluate packets received from network devices 130(1)-(N) in order to determine an appropriate flow policy for packets of a new flow and to provide the flow policy to the respective network device for installation. Flow policy manager 210 may encapsulate the flow policy with address information indicating the destination is network device 130 and internally route the encapsulated flow policy to the TX module, which transmits the encapsulated flow policy toward network device 130. Marker loopback 170 is configured to communicate with flow policy manager 210 and to detect that a marker packet is received in a packet-in stream from a network device 130. In response to such detection, marker loopback 170 is configured to generate a corresponding marker packet (which may be encapsulated with address information indicating the corresponding marker packet's destination is network device 130) and to transmit the corresponding marker packet in a packet-out stream to network device 130. Flow policy manager 210 is also configured to encapsulate a returning packet of a new flow (e.g., packets of packet-in stream) with address information indicating the packet's destination is network device 130 and internally route the encapsulated packet to the TX module, which transmits the encapsulated packet as part of a packet-out stream toward network device 130. Communication between the various components of marker handler 160 and marker loopback 170 are further discussed below in connection with FIG. 3A-3E.

Figure 3A:
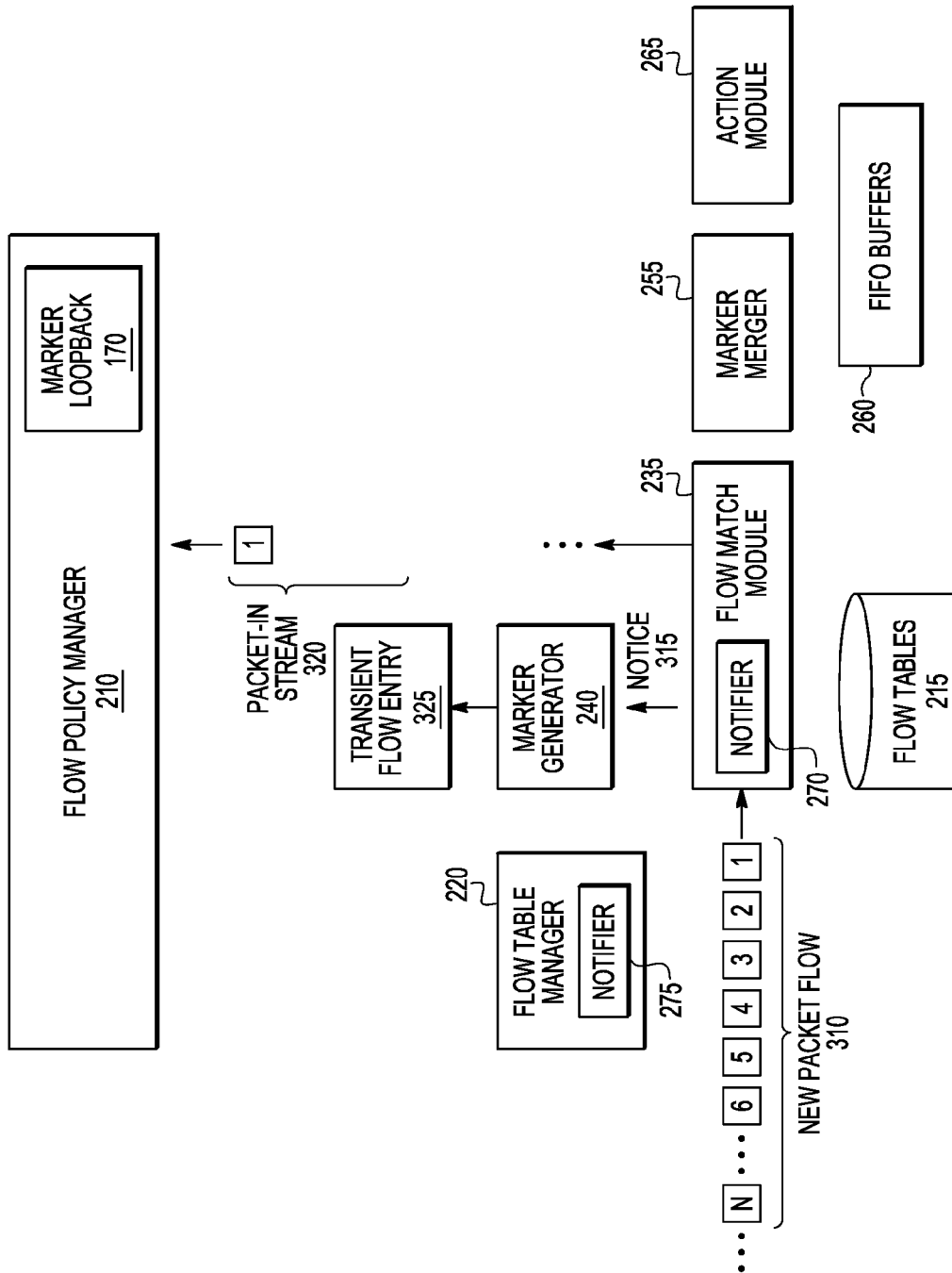
FIG. 3A-3E illustrates block diagrams depicting an example packet reordering process, according to some embodiments.

FIG. 3A-3E illustrates block diagrams depicting an example packet reordering process. In FIG. 3A, flow match module 235 begins receiving packets (e.g., packets 1 through N) of a new packet flow 310 (also referred to as new flow 310). In response to receiving a packet of new flow 310, flow match module 235 consults one or more flow tables and a transient table, if present, to determine whether a flow entry exists for the received packet. For example, flow match module 235 extracts information from the first packet that describes new flow 310, such as a source and destination address of the first packet, to search for a flow entry that includes matching information. Since the first packet is part of a new flow 310, flow match module 235 finds no match for the extracted information of the first packet (in either the flow tables or in the transient table) and determines that a flow entry for the first packet of new flow 310 does not exist.

Notifier 270 detects that flow match module 235 has determined that a flow entry does not exist. In response to detecting that a flow entry does not exist, notifier 270 notifies marker generator 240 that a new flow is being received, such as by sending a notice 315 (e.g., a message or a signal) to marker generator 240. In response to notice 315, marker generator 240 creates a transient flow entry 325 that includes information describing new flow 310, such as the source address and destination address of the first packet of new flow 310 extracted by flow match module 235, which may be included in notice 315 or sent separately to marker generator 240. Transient flow entry 325 indicates that new flow 310 is in a packet-in state (e.g., a flow policy has not yet been locally installed for the new flow and packets of the new flow are being sent to controller 120 as a packet-in stream). Transient flow entries are further discussed below in connection with FIGS. 4A and 4B. Also, in response to determining that a flow entry does not exist, flow match module 235 transmits the first packet as part of packet-in stream 320 to flow policy manager 210 for flow policy evaluation.

Figure 3B:
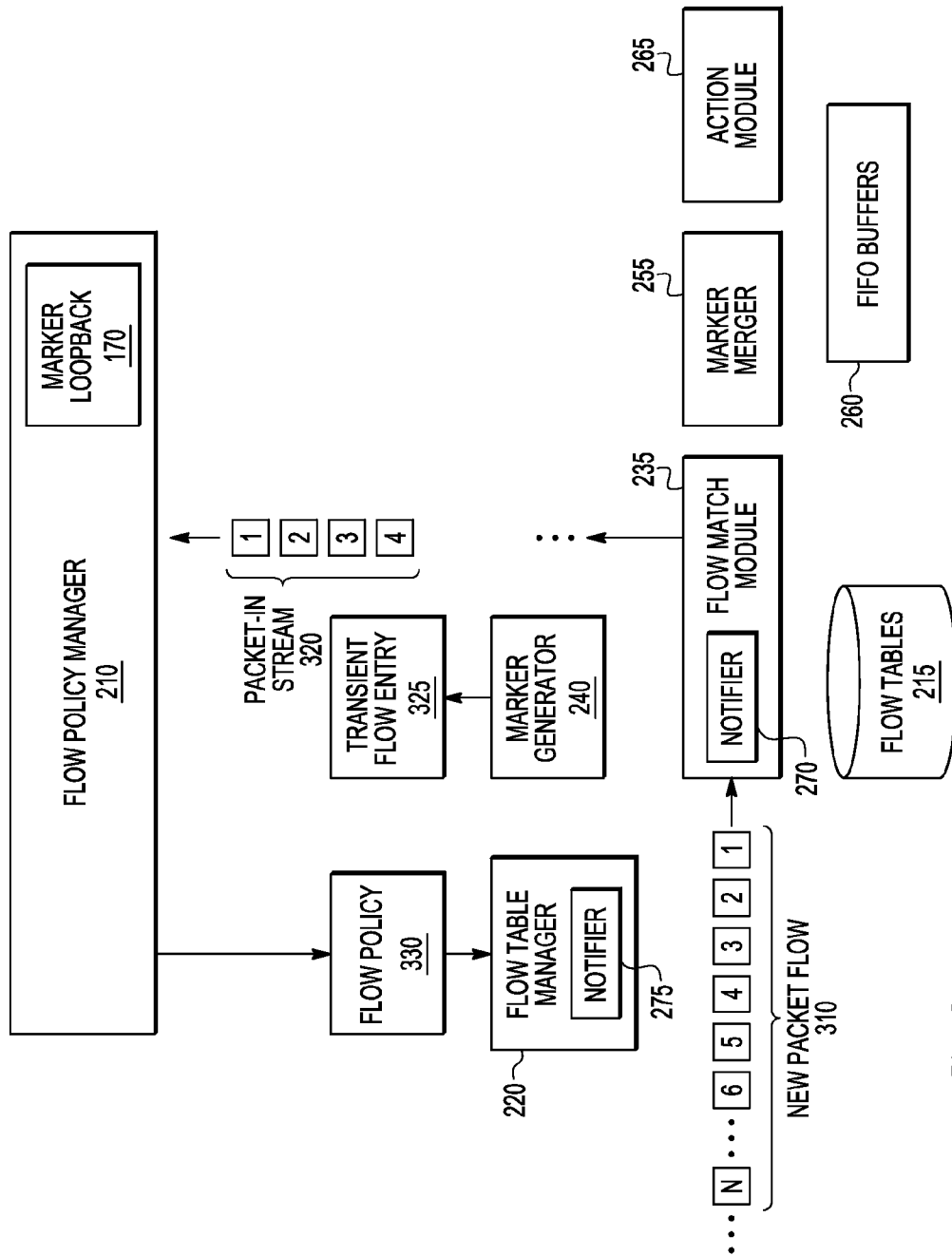

In FIG. 3B, flow match module 235 receives a second packet of new flow 310. In response, flow match module 235 consults flow tables and the transient table, if present, to determine whether a flow entry exists for the received packet. Flow match module 235 finds matching information in transient flow entry 325, which still indicates that new flow 310 is in a packet-in state. Flow match module 235 then transmits the second packet to flow policy manager 210 as part of packet-in stream 320. Flow match module 235 repeats this process for each received packet (e.g., when receiving a third and fourth packet of new flow 310) until a new flow policy is received from flow policy manager 210.

Meanwhile, flow policy manager 210 receives the first packet of new flow 310 transmitted by network device 130. Since marker loopback module 170 determines that the first packet is not a marker packet, flow policy manager 210 performs evaluation of the first packet and determines an appropriate flow policy 330 for new flow 310 (e.g., determines an existing flow policy covers new flow 310, adds new flow 310 to an existing flow policy, or generates a new flow policy for the new flow 310). Once flow policy manager 210 has determined flow policy 330 for new flow 310, flow policy manager 210 transmits flow policy 330 to network device 130. Flow policy manager 210 also begins transmitting a packet-out stream 340, which is further discussed below in connection with FIG. 3D.

Flow table manager 220 receives flow policy 330, which includes a data path for new flow 310, from flow policy manager 210. Flow table manager 220 updates flow tables in flow table storage 215 with flow policy 330 by installing the flow policy 330 in a new flow entry in one of the flow tables. In the example shown, flow table manager 220 updates the flow tables at a point after flow match module 235 has transmitted a fourth packet of new flow 310 to controller 120 and before flow match module 235 has searched for a flow entry using information extracted from a fifth packet of new flow 310. In this manner, packets 1 through 4 of new flow 310 represent the initial packets received before installation of flow policy 330 for new flow 310 (where the number of initial packets is not limited to only 4 packets, but may be any number of packets), and packets 5 through N represent the packets received subsequent to installation of flow policy 330 for new flow 310 (where the number of subsequently received packets is not limited to beginning with a fifth packet, but may be any number of packets).

Figure 3C:
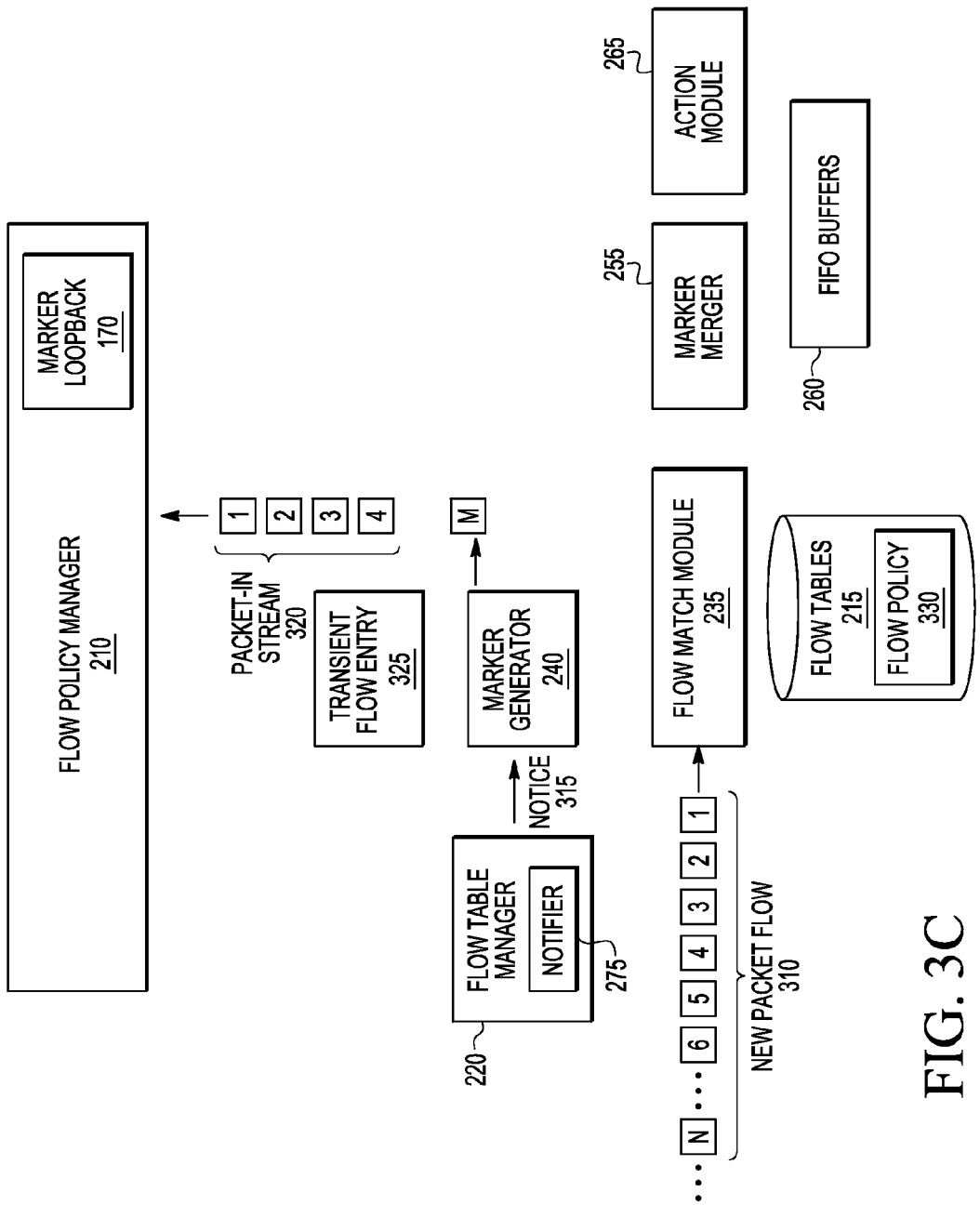

In FIG. 3C, notifier 275 detects that flow table manager 220 has updated flow table storage 215 with new flow policy 330. In response to detecting that new flow policy 330 has been installed in flow table storage 215, notifier 275 notifies marker generator 240 that flow policy 330 for new flow 310 has been installed, such as by sending notice 315 (e.g. a message or a signal) to marker generator 240. In some embodiments, notice 315 includes information identifying the new flow, such as source and destination addresses. In response to receiving notice 315, marker generator 240 generates a marker packet M and inserts the marker packet into the packet-in stream 320 (which in this example is after the fourth packet). At this point, flow match module 235 has not yet searched for a flow entry using information extracted from the fifth packet of new flow 310. In some embodiments, marker generator 240 also updates transient flow entry 325 to indicate that new flow 310 is now in a packet-out state (e.g., a flow policy has been installed for the new flow and packets of the new flow and packets of the new flow are being received from controller 120 as a packet-out stream, as further discussed in connection with FIG. 3D).

Figure 3D:
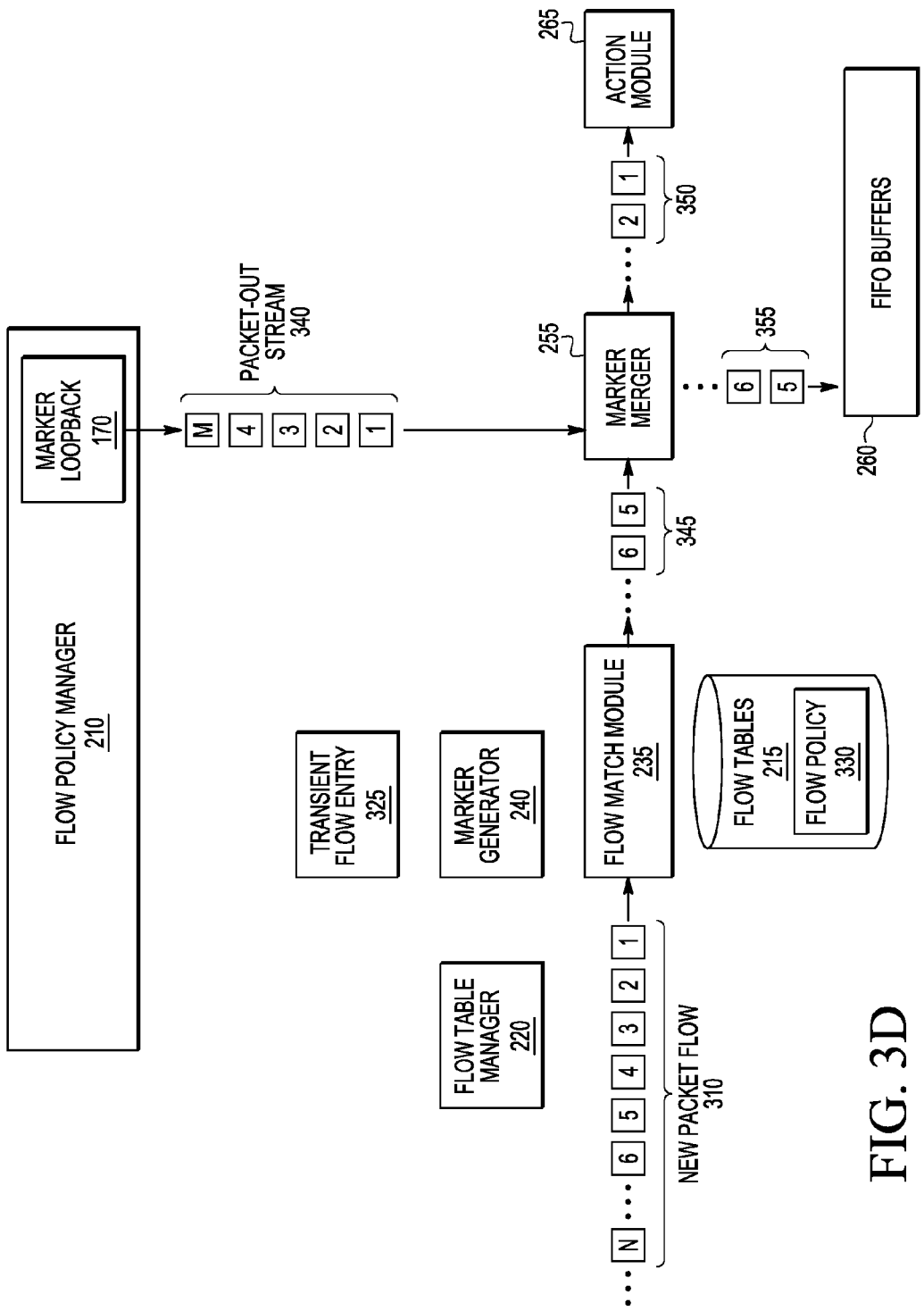

In FIG. 3D, flow match module 235 consults flow tables and the transient table, if present, to determine whether a flow entry exists for the fifth received packet of new flow 310. Since flow policy 330 has been installed in a flow entry in the flow tables, flow match module 235 determines that a flow entry exists for the fifth packet. In response to determining a flow entry in the flow tables exists (where, in some embodiments, the existing flow entry is also the transient flow entry that has packet-out state), flow match module 235 forwards the fifth packet, and all packets of the new flow that are received subsequent to the installation of flow policy 330 (referred to as subsequently received packets 345 of new flow 310), on to marker merger 255. Meanwhile, flow policy manager 210 transmits the packets received via packet-in stream 320 as a packet-out stream 340 to network device 130, which will also be forwarded on to marker merger 255.

Depending on the number of hops separating network device 130 and controller 120, marker merger 255 may likely receive subsequently received packets 345 before the packet-out stream 340. To prevent forwarding packets that are out of order, marker merger 255 is configured to forward subsequently received packets 345 to FIFO buffer 260 for storage while the initial packets of new flow 310 are being received in packet-out stream 340.

When marker merger 255 receives one of the subsequently received packets 345 from flow match module 235, marker merger 255 consults the flow tables and the transient table, if present, to determine whether a transient flow entry exists for the received packet. Since a transient flow entry exists for that subsequently received packet (of new flow 310), marker merger 255 determines that the subsequently received packet should be stored until the initial packets of new flow 310 are received. Marker merger 255 then forwards the subsequently received packet to FIFO buffers 260 for transient storage.

When marker merger 255 receives a packet as part of the packet-out stream 340 from flow policy manager 210, marker merger 255 consults the flow tables and the transient table, if present, to determine whether a transient flow entry exists for the received packet. Since a transient flow entry exists for that packet (of new flow 310), marker merger 255 determines that the packet should be forwarded to action module 265. Marker merger 255 then forwards the packet to action module 265 for appropriate processing, shown as path 350.

Figure 3E:
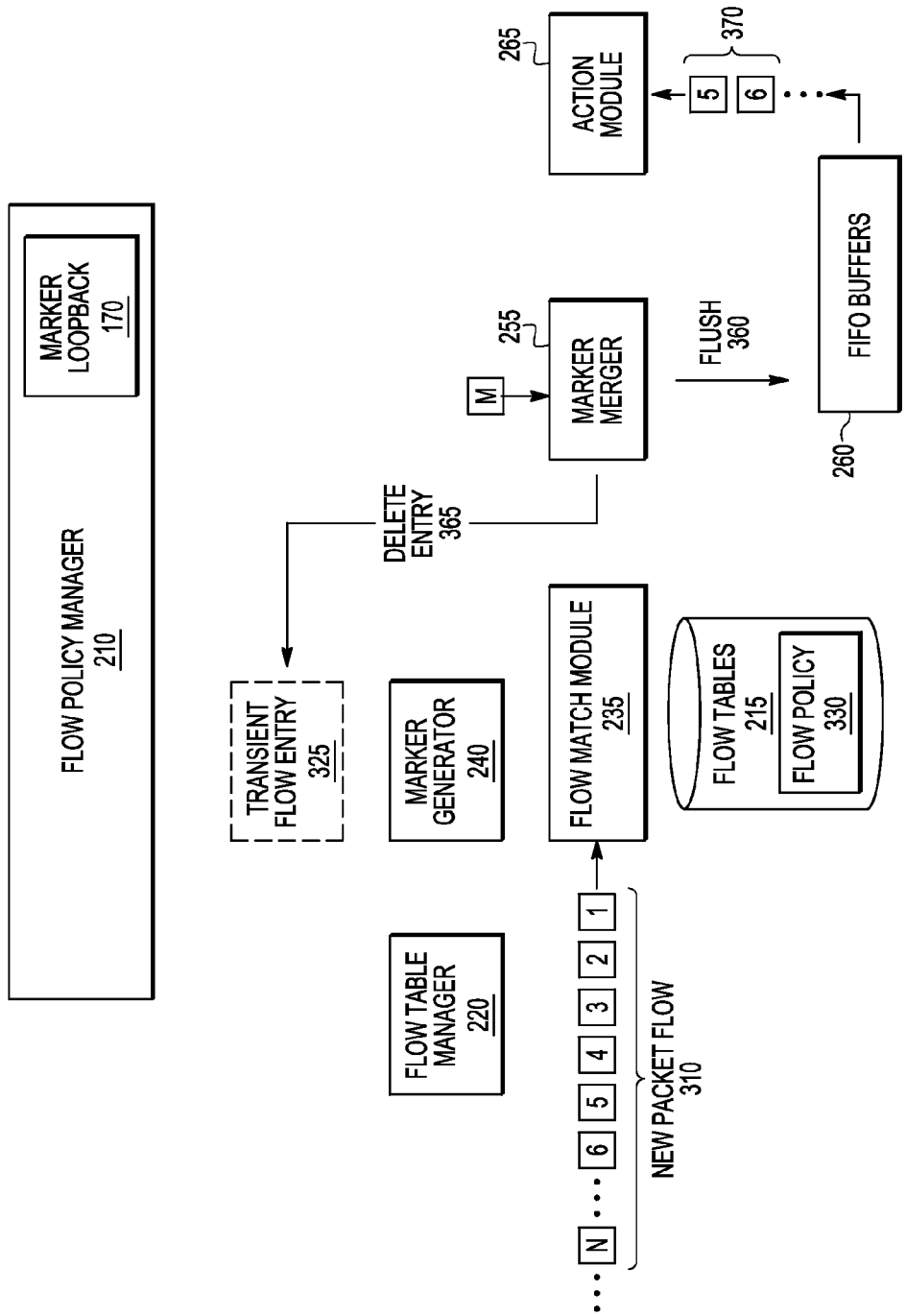

In FIG. 3E, marker merger 255 receives marker packet M as part of the packet-out stream 340, indicating that all initial packets of new flow 310 that were originally sent to flow policy manager 210 have been received. In response to receipt of marker packet M, marker merger 255 flushes FIFO buffers 260, such as by sending a flush request or command 360 (e.g., a message or a signal) to FIFO buffer 260. In response FIFO buffer 260 outputs the subsequently received packets to action module 265 for appropriate processing, shown as path 370.

Also, in response to receipt of marker packet M, marker merger 255 removes transient flow entry 325 for the new flow. In some embodiments, transient flow entry 325 is removed by deletion of transient flow entry 325 from the transient table, which indicates that the new flow is in a normal processing state (e.g., no longer in a packet-in state nor a packet-out state). In other embodiments, transient flow entry 325 is removed by removing or clearing transient status from transient flow entry 325 that is stored in the one or more flow tables, which also indicates that the new flow is in a normal processing state. Any subsequently received packets of flow 310 are identified by flow match module 235 as having a matching flow policy and are forwarded to marker merger 265. The subsequently received packets are also identified by marker merger 265 as lacking a transient flow entry and are forwarded to action module 265 for appropriate processing.

Figure 4A:
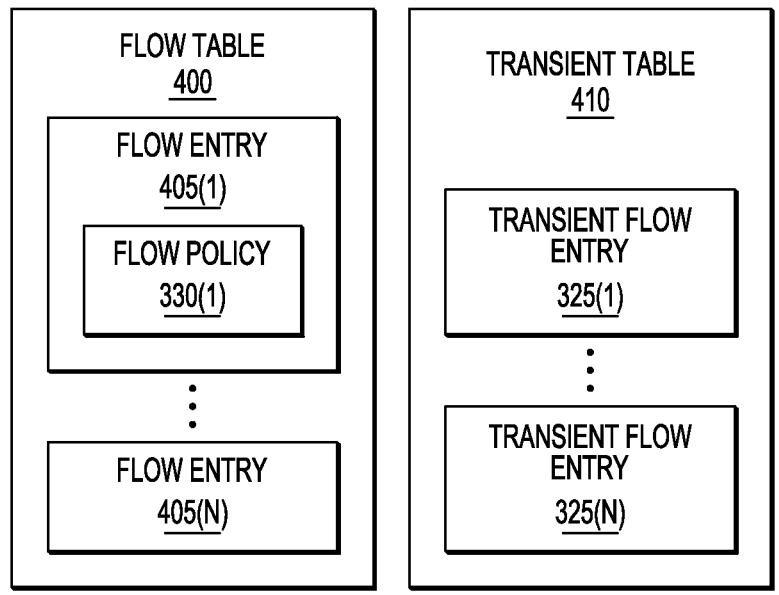
FIGS. 4A and 4B illustrate block diagrams depicting example flow and transient tables, according to some embodiments.
Figure 4B:
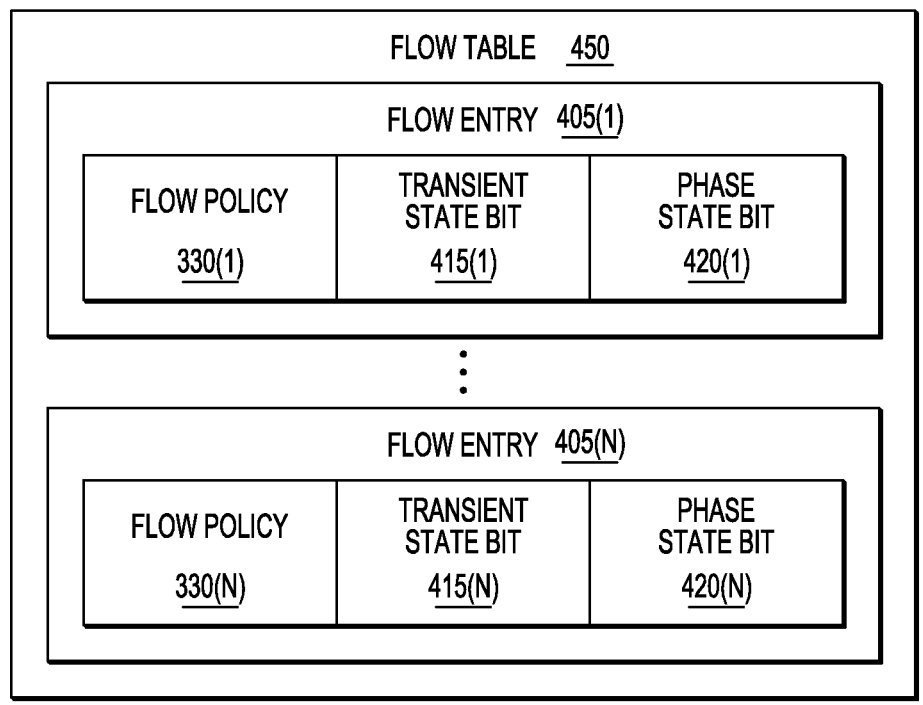

FIGS. 4A and 4B illustrate block diagrams depicting example flow and transient tables. FIG. 4A illustrates one embodiment that includes a flow table 400 and a transient table 410. One or more flow tables 400 are stored in flow table storage 215. Transient table 410 may also be stored in flow table storage 215 or in another storage area. Flow table 400 includes a plurality of flow entries 405(1)-(N), where each entry is configured to store a flow policy 330 that describes a data path for a respective packet flow. Flow entries 405(1)-(N) are also referred to herein as non-transient flow entries. Transient table 415 includes a plurality of transient flow entries 325(1)-(N), where each entry is configured to store information that identifies a (new) flow, also referred to as identifying information. Marker handler 160 also includes logic additive to flow match module 235 that enables flow match module 235 to search transient table 410 for matching transient flow entries, as discussed above. Examples of identifying information include, but are not limited to, an ingress port, metadata, a source address (such as an Internet Protocol (IP) source address or an Ethernet source address), a destination address (such as an IP destination address or an Ethernet destination address), an Ethernet type, a VLAN (virtual local area network) identifier, a VLAN priority value, an MPLS (multi-protocol label switching) label, an MPLS traffic class, a transport source port, a transport destination port, type of service (ToS) bits, and the like.

Flow policy 330 includes a rule and an action. A rule includes identifying information of the new flow. An action indicates how a packet of the new flow should be processed, such as whether to forward the packet to one or more ports (which describes the data path the packet should take), whether to drop the packet, whether to perform other processing on the packet, and the like.

FIG. 4B illustrates another embodiment that includes a flow table 450 that is stored in flow table storage 215. Flow table 450 includes a plurality of flow entries 405(1)-(N), where each entry is configured to store a flow policy 330 that describes a data path for a respective packet flow, a transient state bit 415, and a phase state bit 420. Transient state bit 415 indicates whether the flow entry 405 is in a transient state (e.g., set bit) or a non-transient state (e.g., cleared bit). The transient state indicates that the flow is in either a packet-in state or a packet-out state, and the non-transient state indicates that the flow is in a normal processing state. Phase state bit 420 indicates whether the flow entry is in the packet-in state or the packet-out state (e.g., where a set bit indicates packet-in state and a cleared bit indicates packet-out state, or where a cleared bit indicates packet-in state and a set bit indicates packet-out state).

Transient status is represented by transient state bit 415, where the flow entry 405 has transient status when transient state bit 415 is set, and transient status is removed from flow entry 405 when transient state bit 415 is cleared (indicating normal processing state). Flow entries 405(1)-(N) that have transient status are referred to herein as transient flow entries. Flow entries 405(1)-(N) that do not have transient status are referred to herein as non-transient flow entries.

When a flow entry 405 is initially created for a new flow, the entry 405 initially stores identifying information that identifies the new flow in place of flow policy 330, where identifying information is discussed above in connection with FIG. 4A. Also, when flow entry 405 is initially created, transient state bit 415 is set to indicate transient state and phase state bit 420 is set to indicate packet-in state. When flow policy 330 for the new flow is received, the identifying information is overwritten with flow policy 330 (or updated with additional information present in flow policy 330) and phase state bit 420 is set to indicate packet-out state. When a corresponding marker packet is received, transient state bit 415 is cleared to indicate non-transient (or normal processing) state.

Figure 5:
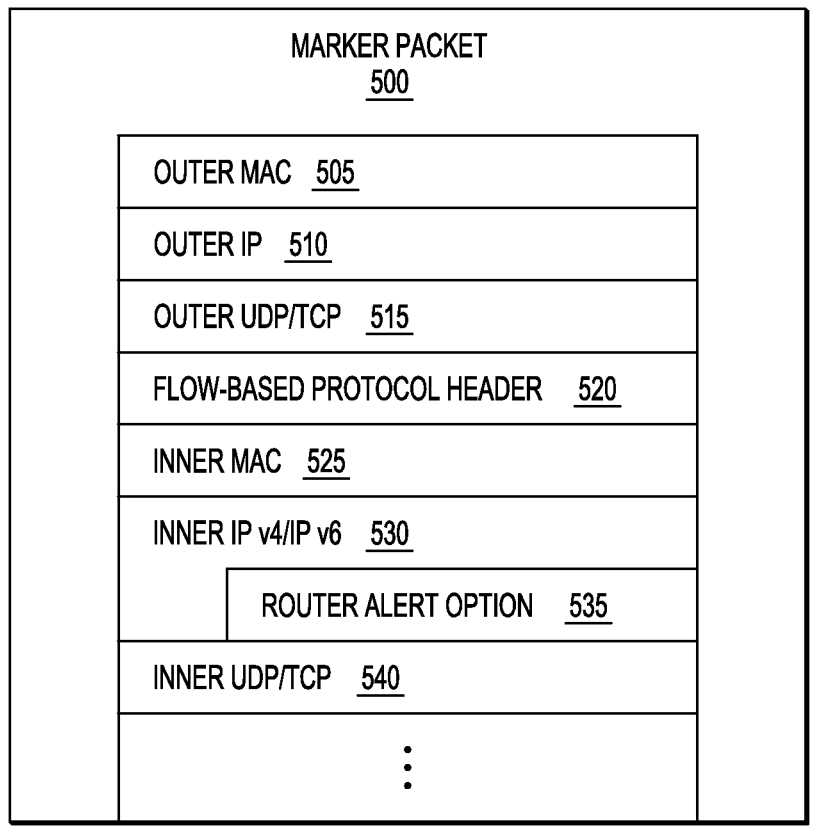
FIG. 5 illustrates a block diagram depicting an example marker packet format, according to some embodiments.

FIG. 5 illustrates a block diagram depicting an example marker packet format 500. Marker packets each include an outer MAC (Media Access Control) header 505, an outer IP (Internet Protocol) header 510, an outer UDP (User Datagram Protocol)/TCP (Transmission Control Protocol) header 515, a flow-based protocol header 520, an inner MAC header 525, an inner IPv4/IPv6 header 530 that includes a router alert option setting 535, and an inner UDP/TCP header 540.

Marker generator 240 generates a marker packet by copying the header fields 525, 530, and 540 from a packet of the new flow over to a new packet, sets header 520 according to the flow-based protocol, and sets the router alert option 535 to identify the new packet as a marker packet. Marker generator 240 also sets header fields 505, 510, and 515 with information identifying controller 120 as the destination of the marker packet. When marker loopback 170 receives packets, marker loopback 170 is configured to detect whether the router alert option 535 is set, which identifies the packet as a marker packet. Marker loopback 170 generates a returning marker packet by copying the header fields 525, 530, and 540 from the received marker packet into a new packet, sets header 520 according to the flow-based protocol, and sets the router alert option 535 to identify the new packet as a marker packet. Marker loopback 170 also sets header fields 505, 510, and 515 with information identifying network device 130 as the destination of the returning marker packet.

Figure 6:
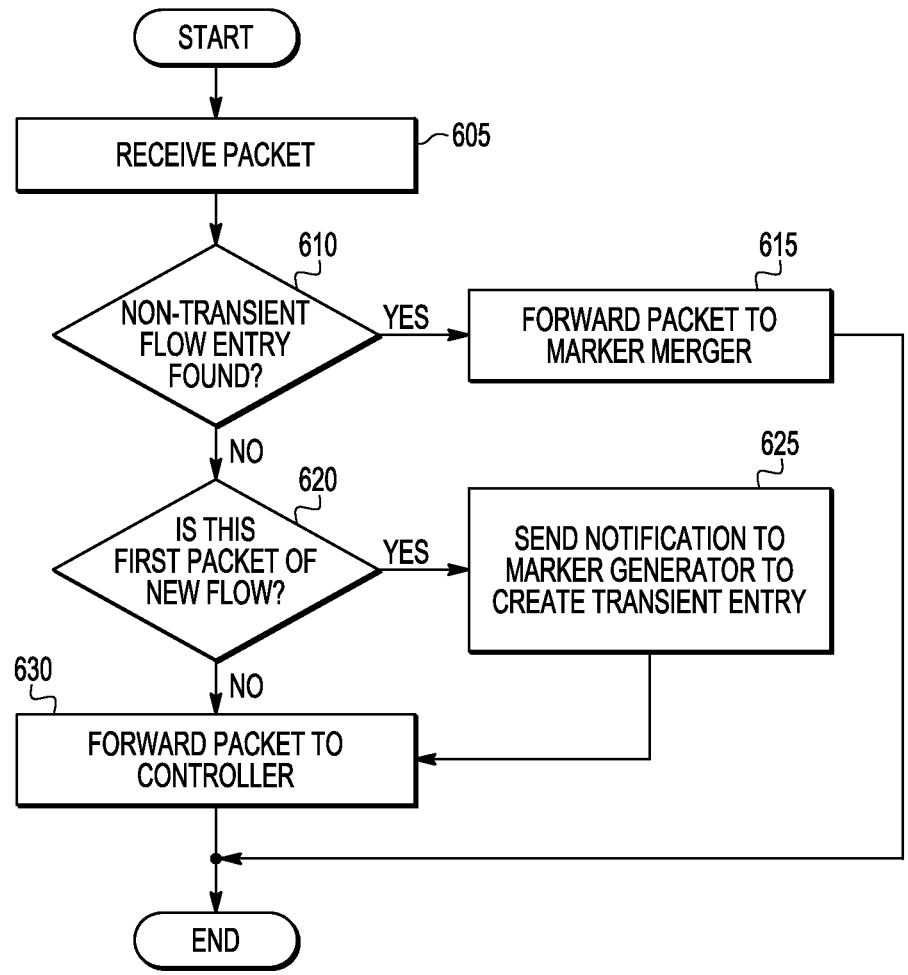
FIG. 6 illustrates a flowchart depicting an example flow match process, according to some embodiments.

FIG. 6 illustrates a flowchart depicting an example flow match process implemented by flow match module 235 in cooperation with components of marker handler 160. The process illustrated in FIG. 6 is performed for each packet received by flow match module 235. The process starts at operation 605, where flow match module 235 receives a packet from another network device in the network. The process continues to operation 610, where flow match module 235 determines whether a non-transient flow entry in one or more flow tables is found for the packet, using identifying information of the packet. If a matching non-transient flow entry is found (indicating that the packet is part of an existing flow that has an installed flow policy), the process continues to operation 615, where flow match module 235 forwards the packet to marker merger 255. The process then ends.

Returning to operation 610, if a matching non-transient flow entry is not found (indicating that the packet is part of a new flow), the process continues to operation 620, where flow match module 235 determines whether this is the first received packet of a new flow, using identifying information of the packet. In one embodiment, flow match module 235 determines whether a matching transient flow entry in a transient table is found for the packet. In another embodiment, flow match module 235 determines whether a matching transient flow entry in one or more flow tables is found for the packet.

If a matching transient flow entry (in one embodiment) or a matching transient flow entry (in another embodiment) is not found (indicating that the packet is the first received packet), the process continues to operation 625, where notifier 270 sends a notification to marker generator 240 to create a transient flow entry in the transient table (in one embodiment) or to create a transient flow entry in the one or more flow tables (in another embodiment) for the new flow. The process then continues to operation 630, where flow match module 235 forwards the packet via the packet-in stream to the controller for evaluation. The process then ends.

Returning to operation 620, if a matching transient flow entry (in one embodiment) or a matching transient flow entry (in another embodiment) is found for the packet (indicating that the packet is not the first received packet, but is still one of the initial packets of the new flow received before installation of flow policy), the process continues to operation 630, where flow match module 235 forwards the packet via the packet-in stream to the controller for evaluation. The process then ends.

Figure 7:
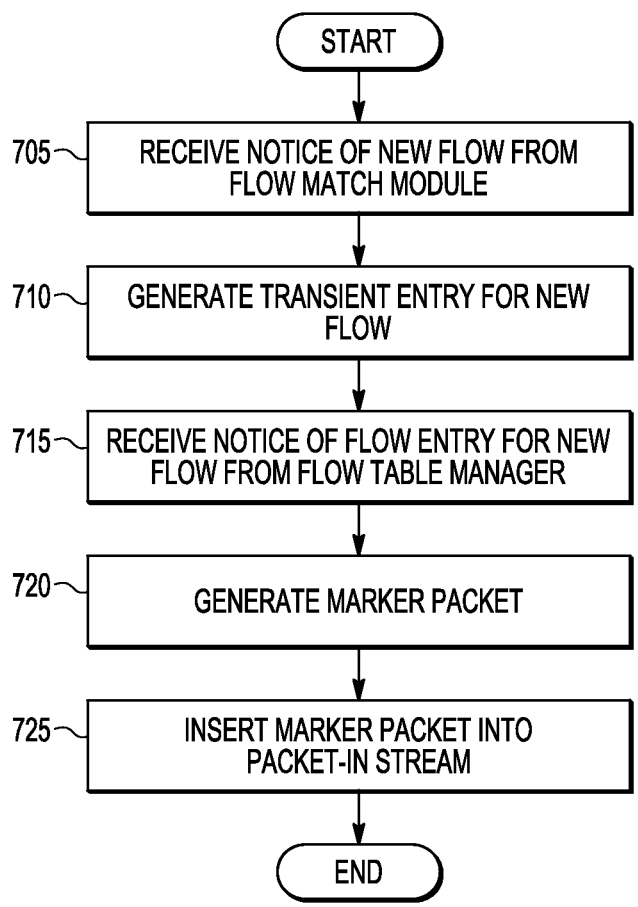
FIG. 7 illustrates a flowchart depicting an example marker generation process, according to some embodiments.

FIG. 7 illustrates a flowchart depicting an example marker generation process implemented by marker generator 240 of marker handler 160. The process starts at operation 705, where marker generator 240 receives a notification about a new flow from notifier 270 at flow match module 235. The process continues to operation 710, where marker generator 240 generates a new transient entry for the new flow, which may be stored in either a flow table or in a transient table. The process continues to operation 715, where marker generator 240 receives a notification about an installed flow entry for the new flow from notifier 275 at flow table manager 220. The process continues to operation 720, where marker generator 240 generates a marker packet. The process continues to operation 725, where marker generator 240 inserts the marker packet into packet-in stream to controller 210. The process then ends.

Figure 8:
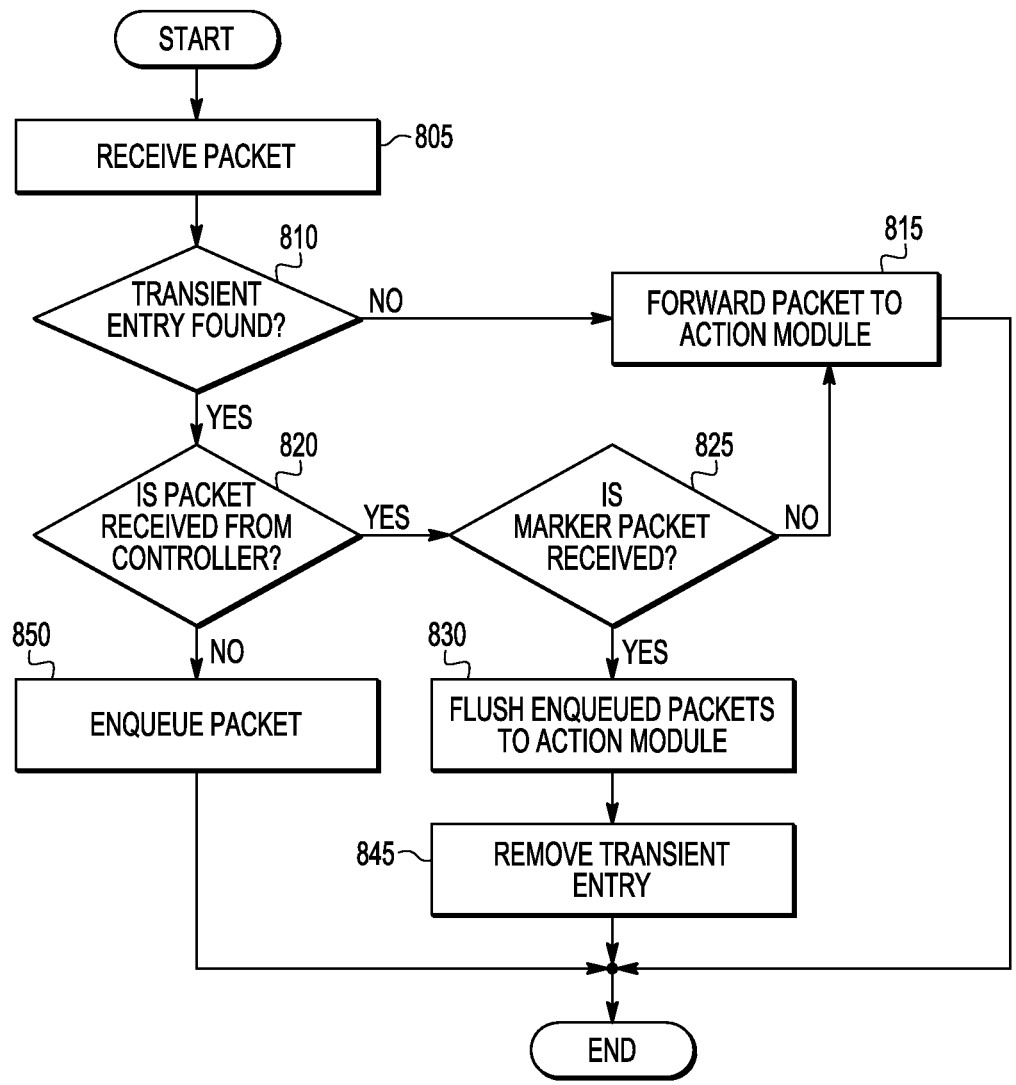
FIG. 8 illustrates a flowchart depicting an example marker merge process, according to some embodiments.

FIG. 8 illustrates a flowchart depicting an example marker merge process implemented by marker merger 255 of marker handler 160. The process starts at operation 805, where marker merger 255 receives a packet. The process continues to operation 810, where marker merger 255 determines whether a transient flow entry is found for the packet, using identifying information. If no transient flow entry is found (indicating the packet is part of an existing flow having normal processing state), the process continues to operation 815, where marker merger 255 forwards the packet to action module 265 for processing. The process then ends.

Returning to operation 820, if a transient flow entry is found (indicating the packet is part of a new flow), the process continues to operation 820, where marker merger 255 determines whether the packet is received from controller 120. If the packet is not received from the controller (indicating the packet is a subsequently received packet of the new flow that is received from another network device), the process continues to operation 850, where marker merger 255 enqueues the packet in FIFO buffers to wait for processing after the initial packets of the new flow are received. The process then ends.

Returning to operation 820, if the packet is received from controller 120 (indicating the packet is part of the packet-out stream), the process continues to operation 825, where marker merger 255 determines whether a marker packet is received (e.g., whether the packet received in operation 805 is a marker packet). If a marker packet is not received (indicating that the packet is one of the initial packets of the new flow), the process continues to operation 815, where marker merger 255 forwards the packet to action module 265 for processing. The process then ends.

Returning to operation 825, if a marker packet is received (indicating the initial packets of the new flow have been received), the process continues to operation 830, where marker merger 255 flushes the enqueued (subsequently received) packets in FIFO buffers to action module 265 for processing. The process continues to operation 845, where marker merger 255 removes the transient flow entry (such as by removing or deleting the transient flow entry from a transient table or by removing or clearing transient status from the transient flow entry in a flow table). The process then ends.

Figure 9:
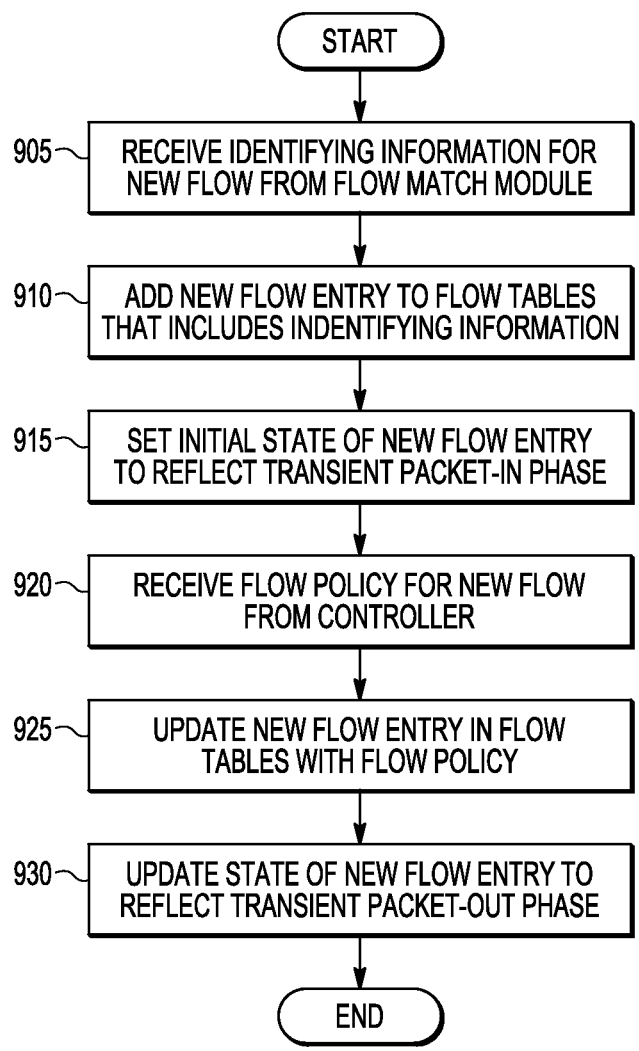
FIG. 9 illustrates a flowchart depicting an example flow table update process, according to some embodiments.

FIG. 9 illustrates a flowchart depicting an example flow table update process 240 implemented by flow table manager 220 and components of marker handler 160. The process illustrated in FIG. 9 is implemented in an embodiment in which a transient flow entry is stored in the flow tables maintained by flow table manager 220. The process starts at operation 905, where flow table manager 220 receives identifying information for a new flow from flow match module 235. In some embodiments, notice 315 sent by notifier 270 includes identifying information extracted from the received packet by flow match module 235. Notice 315 is received by marker generator, which is configured to communicate the identifying information in notice 315 to flow table manager 220 and to instruct flow table manager 220 to create a new flow entry for the new flow that includes the identifying information.

The process continues to operation 910, where flow table manager 220 adds a new flow entry to the flow tables that includes the identifying information. The process continues to operation 915, where flow table manager 220 sets an initial state of new flow entry (e.g., by setting a transient state bit and a phase state bit of the new flow entry) to reflect a transient packet-in phase. The new flow entry with transient state is also referred to as a transient flow entry.

The process continues to operation 920, where flow table manager 220 receives flow policy for the new flow from controller 120. The process continues to operation 925, where flow table manager 220 updates the new (transient) flow entry in the flow tables with the received flow policy (e.g., installs the flow policy by updating or overwriting the identifying information with the received flow policy). The process continues to operation 930, where flow table manager 220 updates the state of the new (transient) flow entry (e.g., by clearing the phase state bit of the new flow entry) to reflect a transient packet-out phase. The process then ends.

Figure 10:
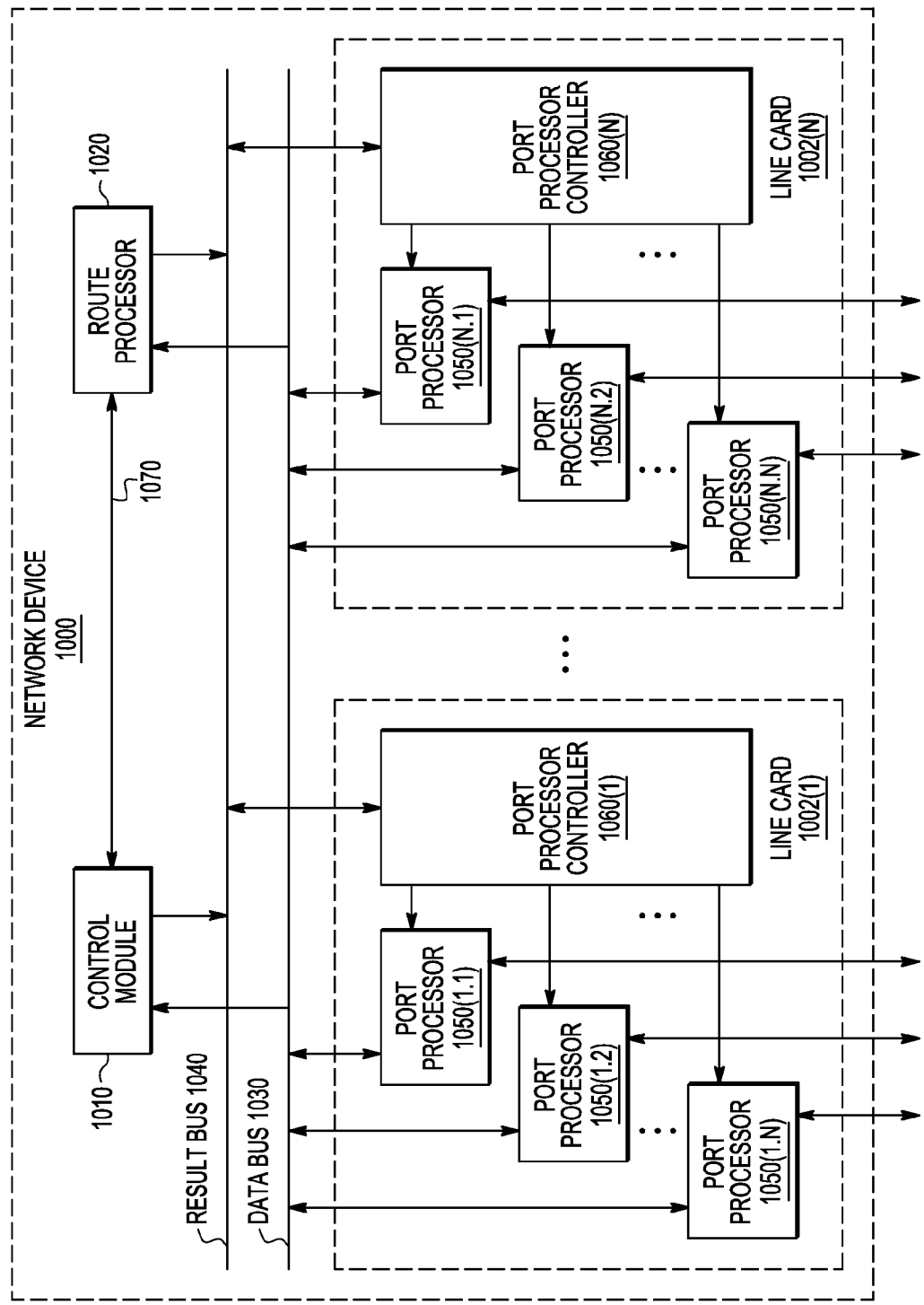
FIG. 10 illustrates a block diagram depicting relevant components of an example network device in which the present disclosure can be implemented, according to one embodiment.

FIG. 10 illustrates a block diagram depicting relevant components of an example network device 1000 (e.g., network device element 130(1)-(N) or controller 120 of FIG. 1) in which the present disclosure can be implemented. In this depiction, network device 1000 includes a number of line cards (line cards 1002(1)-1002(N)) that are communicatively coupled to a control module 1010 (which can include a forwarding engine, not shown) and a route processor 1020 via a data bus 1030 and a result bus 1040. Line cards 1002(1)-(N) include a number of port processors 1050(1,1)-1050(N,N) which are controlled by port processor controllers 1060(1)-1060(N). It will also be noted that control module 1010 and route processor 1020 are not only coupled to one another via data bus 1030 and result bus 1040, but are also communicatively coupled to one another by a communications link 1070. In alternative embodiments, each line card can include its own forwarding engine.

When a message (e.g., packet or flow policy) is received, the message is identified and analyzed by a network device such as network device 1000 in the following manner. Upon receipt, a message (or some or all of its control information) is sent from one of the port processors 1050(1,1)-1050(N,N) at which the message was received to one or more of those devices coupled to data bus 1030 (e.g., others of port processors 1050(1,1)-1050(N,N), a forwarding engine, and/or route processor 1020). Handling of the message can be determined, for example, by a forwarding engine. For example, a forwarding engine may determine that the message should be forwarded to one or more of port processors 1050(1,1)-1050(N,N). This can be accomplished by indicating to corresponding one(s) of port processor controllers 1060(1)-1060(N) that the copy of the message held in the given one(s) of port processors 1050(1,1)-1050(N,N) should be forwarded to the appropriate one of port processors 1050(1,1)-1050(N,N).

Network device 1000 can be configured to implement marker handler module 160, including marker generator 240 and marker merger 255 (e.g., in control module 1010, or in one of port processor controllers 1060(1)-1060(N) and/or in route processor 1020) in order to generate and transmit a marker packet for a set of packets of a new flow to controller 120 and to merge the set of packets returning from the controller 120 into an ongoing stream of received packets (e.g., received from another network device) of a new flow. Network device 1000 can thus implement the processes illustrated in FIG. 6-9. A network device 1000 can also be configured to implement marker loopback module 170 (e.g., in control module 1010, or in one of port processor controllers 1060(1)-1060(N) and/or in route processor 1020) in order to receive a marker packet for a set of packets of a new flow from a network device and send a returning marker packet for the set of packets to the network device.

Figure 11B:
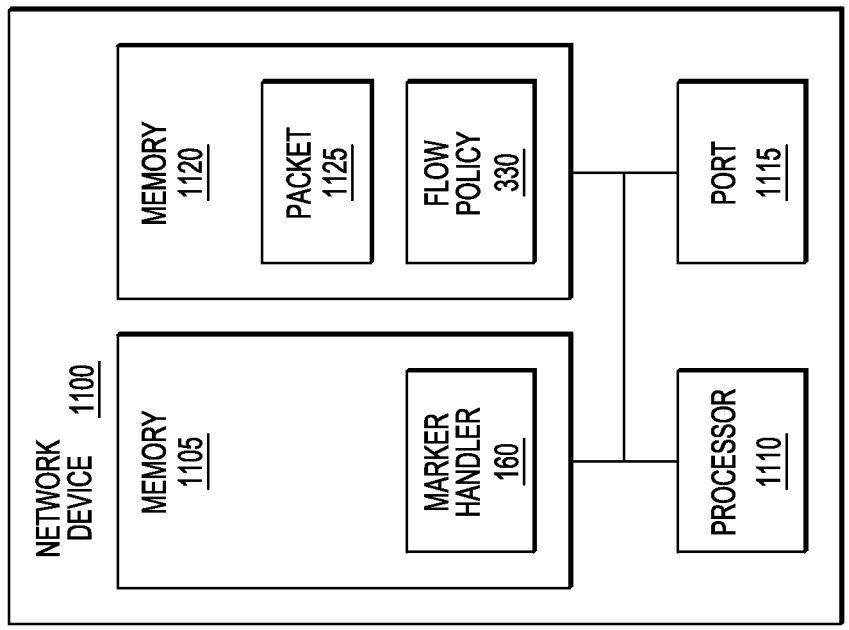
FIGS. 11A and 11B illustrate block diagrams depicting relevant components of example network devices in which the present disclosure can be implemented, which illustrates how the present disclosure can be implemented in software, according to one embodiment.
Figure 11A:
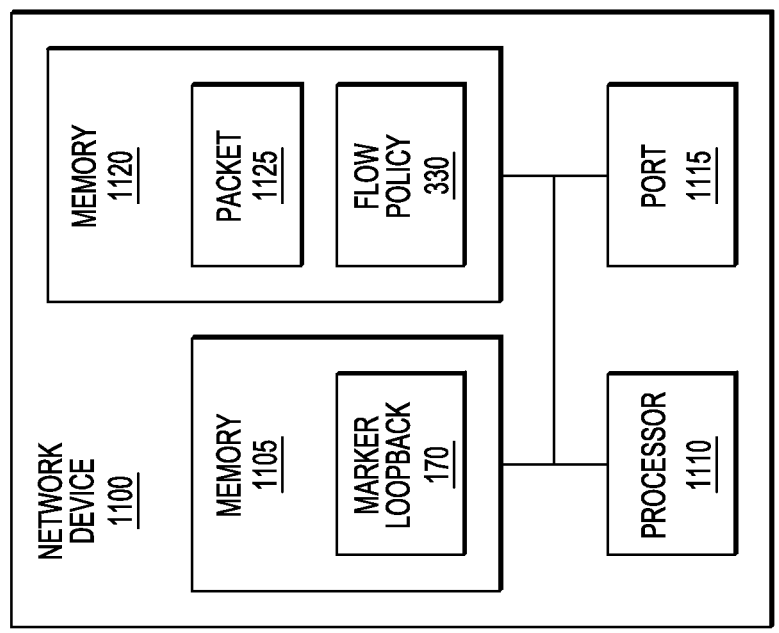

FIG. 11A illustrates a block diagram depicting relevant components of an example network device, illustrating how marker loopback module 170 can be implemented in software. As illustrated, network device 1100 includes one or more processors 1110 (e.g., microprocessors, PLDs (Programmable Logic Devices), or ASICs (Application Specific Integrated Circuits)) configured to execute program instructions stored in memories 1105 and/or 1120. Memories 1105 and 1120 can include various types of RAM (Random Access Memory), ROM (Read Only Memory), Flash memory, MEMS (Micro Electro-Mechanical Systems) memory, and the like. Network device 1100 also includes one or more ports 1115 (e.g., one or more hardware ports or other network interfaces that can be linked to other network devices, hosts, servers, storage devices, or the like). Processor 1110, port 1115, and memories 1105 and 1120 are coupled to send and receive data and control signals by one or more buses or other interconnects.

In this example, program instructions executable to implement marker loopback module 170 are stored in memory 1105. Marker loopback module 170 includes the functionality needed to perform the process(es) discussed above to receive a marker packet for a set of packets of a new flow from a network device and send a returning marker packet for the set of packets to the network device. Various messages (e.g., packet 1125 and flow policy 330) can be stored in memory 1120. These messages can be stored in memory 1120 prior to being sent on a network via port 1115 and/or in response to being received from a network via port 1115.

The program instructions and/or data executable to implement marker loopback module 170 can be stored on various computer readable storage media. Such computer readable media, such as memory 1105 and 1120, may be permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

FIG. 11B illustrates a block diagram depicting relevant components of an example network device, illustrating how marker handling module 160, including marker generator module 240 and marker merger module 225, can be implemented in software. As illustrated, network device 1100 includes one or more processors 1110 or ASICs, memories 1105 and 1120, and one or more ports 1115, as discussed above in connection with FIG. 11A.

In this example, program instructions executable to implement marker handling module 160 are stored in memory 1105, which is illustrated as marker generator module 240 and marker merger module 225 being stored in memory 1105. Marker handling module 160 includes the functionality needed to perform the process(es) to generate and transmit a marker packet for a set of packets of a new flow to controller 120 and to merge the set of packets returning from the controller 120 into an ongoing stream of received packets (e.g., received from another network device) of the new flow, as discussed above in connection with FIG. 6-9. Various messages (e.g., packet 1125 and flow policy 330) can be stored in memory 1120. These messages can be stored in memory 1120 prior to being sent on a network via port 1115 and/or in response to being received from a network via port 1115.

The program instructions and/or data executable to implement marker handling module 160 can be stored on various computer readable storage media, as discussed above in connection with FIG. 11A.

By now it should be appreciated that there has been provided a scheme that reduces packet reordering during flow setup. In one embodiment of the present disclosure, a method is provided, which includes receiving a first packet of a first flow at a network device and determining whether flow-identifying information extracted from the first packet matches an existing flow entry. The method also includes, in response to a determination that the flow-identifying information does not match any existing flow entries, generating a new transient flow entry that includes the flow-identifying information and packet-in state, and forwarding the first packet to a controller via a packet-in stream.

One aspect of the above embodiment provides that the existing flow entry comprises at least one of a group including: an existing non-transient flow entry stored in a flow table, and an existing transient flow entry stored in one of the flow table and a transient table.

Another aspect of the above embodiment provides that the method further includes receiving a second packet of the first flow at the network device; and in response to a determination that second flow-identifying information extracted from the second packet matches the new transient flow entry having packet-in state, forwarding the second packet to the controller via the packet-in stream.

Another aspect of the above embodiment provides that the method further includes receiving flow policy for the first flow from the controller; and in response to installation of the flow policy in a new flow entry, sending a marker packet to the controller via the packet-in stream, and updating the new transient flow entry to include packet-out state.

Another aspect of the above embodiment provides that the method further includes generating the marker packet, wherein the marker packet includes the flow-identifying information extracted from the first packet.

Another aspect of the above embodiment provides that the method further includes receiving a returning packet of the first flow from the controller via a packet-out stream; and in response to a determination that second flow-identifying information extracted from the returning packet matches the new transient flow entry having packet-out state, processing the returning packet according to the flow policy.

A further aspect of the above embodiment provides that the method further comprises receiving a second packet of the first flow from another network device; and in response to a determination that second flow-identifying information extracted from the second packet matches the new transient flow entry having packet-out state, storing the second packet in a buffer.

Another further aspect of the above embodiment provides that the method further comprises receiving a returning marker packet for the first flow from the controller via a packet-out stream; and in response to a determination that second flow-identifying information extracted from the marker packet matches the new transient flow entry having packet-out state, flushing packets from a buffer, and processing the packets according to the flow policy.

A still further aspect provides that the method includes removing the new transient flow entry, where the removing the new transient flow entry comprises one of removing the new transient flow entry from a transient table, and removing transient status from the new transient flow entry to result in a new non-transient flow entry stored in a flow table.

Another embodiment of the present disclosure provides for a network device that includes a port configured to receive a first packet of a first flow; a first notifier configured to detect a determination made by a flow match module whether flow-identifying information extracted from the first packet matches an existing flow entry; and a marker generator configured to generate a new transient flow entry that includes the flow-identifying information and packet-in state, in response to a notification received from the first notifier that indicates the flow-identifying information does not match any existing flow entries. The flow match module is configured to forward the first packet to a controller via a packet-in stream.

One aspect of the above embodiment provides that the existing flow entry comprises at least one of a group including: an existing non-transient flow entry stored in a flow table, and an existing transient flow entry stored in one of the flow table and a transient table.

Another aspect of the above embodiment provides that the port is further configured to receive a second packet of the first flow. The flow match module is further configured to forward the second packet to the controller via the packet-in stream, in response to a determination that second flow-identifying information extracted from the second packet matches the new transient flow entry having packet-in state.

Another aspect of the above embodiment provides that the network device further includes a second notifier configured to detect installation of a flow policy for the first flow in a new flow entry, where the flow policy is received from the controller. The marker generator is further configured to send a marker packet to the controller via the packet-in stream, in response to a second notification received from the second notifier that indicates the installation is detected, and update the new transient flow entry to include packet-out state, in response to the second notification.

A further aspect provides that the marker generator is further configured to generate the marker packet, wherein the marker packet includes the flow-identifying information extracted from the first packet.

Another further aspect provides that the network device includes a marker merger configured to receive a returning packet of the first flow from the controller via a packet-out stream, and forward the returning packet to an action module, in response to a determination that second flow-identifying information extracted from the returning packet matches the new transient flow entry having packet-out state.

Another further aspect provides that the network device includes a marker merger configured to receive a second packet of the first flow from another network device, and store the second packet in a buffer, in response to a determination that second flow-identifying information extracted from the second packet matches the new transient flow entry having packet-out state.

Another further aspect provides that the network device includes a marker merger configured to receive a returning marker packet for the first flow from the controller via a packet-out stream, and flush packets from a buffer to an action module, in response to a determination that second flow-identifying information extracted from the marker packet matches the new transient flow entry having packet-out state.

A still further aspect provides that the marker merger is further configured to remove the new transient flow entry. The marker merger is configured to perform one of removal of the new transient flow entry from a transient table, and removal of transient status from the new transient flow entry to result in a new non-transient flow entry stored in a flow table.

Another embodiment of the present disclosure provides for a non-transitory computer readable storage medium configured to store program instructions that, when executed on a processor, are configured to cause the processor to perform a method. The method includes receiving a first packet of a first flow at a network device; and determining whether flow-identifying information extracted from the first packet matches an existing flow entry. The method also includes, in response to a determination that the flow-identifying information does not match any existing flow entries, generating a new transient flow entry that includes the flow-identifying information and packet-in state; and forwarding the first packet to a controller via a packet-in stream.

One aspect of the above embodiment provides that the method further includes receiving flow policy for the first flow from the controller; and in response to installation of the flow policy in a new flow entry, sending a marker packet to the controller via the packet-in stream, and updating the new transient flow entry to include packet-out state.

Although the present disclosure has been described with respect to specific embodiments thereof, various changes and modifications may be suggested to one skilled in the art. It is intended such changes and modifications fall within the scope of the appended claims.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. All or some of the software described herein may be received elements of system 100, for example, from computer readable media such as memory or other media on other computer systems.

Some of the above embodiments, as applicable, may be implemented using a variety of different information processing systems. For example, although FIG. 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, network device 1000 and network device 1100 are computer systems, such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method, the method comprising:
   receiving a first packet of a first flow at a network device;
   determining whether flow-identifying information extracted from the first packet matches any existing flow entries;
   in response to a determination that the flow-identifying information does not match any existing flow entries, generating, by the network device, a new transient flow entry that includes the flow-identifying information and packet-in state, wherein the packet-in state indicates that packets of the first flow are presently being forwarded to a controller;
   forwarding the first packet to the controller via a packet-in stream;
   receiving flow policy for the first flow from the controller; and
   in response to installation of the flow policy on the network device,
      sending a marker packet to the controller via the packet-in stream, wherein the marker packet indicates an end to the packet-in stream, and
      updating the new transient flow entry to include packet-out state, wherein the packet-out state indicates that packets of the first flow are no longer being forwarded to the controller.

2. The method of claim 1, wherein
the existing flow entries comprises at least one of a group including:
   an existing non-transient flow entry stored in a flow table, and
   an existing transient flow entry stored in one of the flow table and a transient table,
wherein the existing non-transient flow entry includes flow policy that has been received from the controller and installed on the network device, and
wherein the existing transient flow entry includes transient status that indicates packets of a flow are presently being communicated between the network device and the controller.

3. The method of claim 1, further comprising:
receiving a subsequent packet of the first flow at the network device from another network device before the flow policy has been installed on the network device; and
in response to a determination that second flow-identifying information extracted from the subsequent packet matches the new transient flow entry having packet-in state, forwarding the subsequent packet to the controller via the packet-in stream.

4. The method of claim 1, further comprising:
generating, by the network device, the marker packet, wherein the marker packet includes the flow-identifying information extracted from the first packet.

5. The method of claim 1, further comprising:
receiving a returning packet of the first flow from the controller via a packet-out stream, wherein the returning packet corresponds to a packet forwarded to the controller via the packet-in stream; and
in response to a determination that second flow-identifying information extracted from the returning packet matches the new transient flow entry having packet-out state, processing the returning packet according to the flow policy installed on the network device.

6. The method of claim 1, further comprising:
receiving a subsequent packet of the first flow from another network device after the flow policy has been installed on the network device; and
in response to a determination that second flow-identifying information extracted from the subsequent packet matches the new transient flow entry having packet-out state, storing the subsequent packet in a FIFO (first in first out) buffer.

7. The method of claim 1, further comprising:
receiving a returning marker packet for the first flow from the controller via a packet-out stream, wherein the returning marker packet corresponds to the marker packet sent to the controller via the packet-in stream, and the returning marker packet indicates an end to the packet-out stream; and
in response to a determination that second flow-identifying information extracted from the returning marker packet matches the new transient flow entry having packet-out state,
   flushing a set of packets of the first flow from a FIFO (first in first out) buffer, wherein the set of packets were received at the network device after the marker packet was sent to the controller, and
   processing the set of packets according to the flow policy installed on the network device.

8. The method of claim 7, further comprising:
removing the new transient flow entry in response to receipt of the returning marker packet, wherein
   the removing the new transient flow entry comprises one of
      removing the new transient flow entry from a transient table, and
      removing transient status from the new transient flow entry to result in a new non-transient flow entry stored in a flow table.

9. The method of claim 1, further comprising:
receiving a subsequent packet of the first flow from another network device after the flow policy has been installed on the network device; and
in response to a determination that second flow-identifying information extracted from the subsequent packet does not match any transient flow entries, searching non-transient flow entries for the second flow-identifying information; and in response to a determination that the second flow-identifying information matches a non-transient flow entry, processing the subsequent packet according to the flow policy indicated in the non-transient flow entry.

10. A network device comprising:
a port configured to receive a first packet of a first flow;
a first notifier configured to
   detect a determination made by a flow match module whether flow-identifying information extracted from the first packet matches any existing flow entries;
a marker generator configured to
   generate a new transient flow entry that includes the flow-identifying information and packet-in state, in response to a notification received from the first notifier that indicates the flow-identifying information does not match any existing flow entries, wherein
      the packet-in state indicates that packets of the first flow are presently being forwarded to a controller; and
      the flow match module is configured to forward the first packet to the controller via a packet-in stream; and
a second notifier configured to detect installation of a flow policy for the first flow received from the controller, wherein
the marker generator is further configured to
   send a marker packet to the controller via the packet-in stream, in response to a second notification received from the second notifier that indicates the installation is detected, and
   update the new transient flow entry to include packet-out state, in response to the second notification, wherein the packet-out state indicates that packets of the first flow are no longer being forwarded to the controller.

11. The network device of claim 10, wherein
the existing flow entries comprises at least one of a group including:
   an existing non-transient flow entry stored in a flow table, and
   an existing transient flow entry stored in one of the flow table and a transient table,
   wherein the existing non-transient flow entry includes flow policy that has been received from the controller and installed on the network device, and
   wherein the existing transient flow entry includes transient status that indicates packets of a flow are presently being communicated between the network device and the controller.

12. The network device of claim 10, wherein
the port is further configured to receive a subsequent packet of the first flow from another network device before the flow policy is installed on the network device,
   wherein the flow match module is further configured to forward the subsequent packet to the controller via the packet-in stream, in response to a determination that second flow-identifying information extracted from the subsequent packet matches the new transient flow entry having packet-in state.

13. The network device of claim 10, wherein
the marker generator is further configured to generate the marker packet, wherein the marker packet includes the flow-identifying information extracted from the first packet.

14. The network device of claim 10, further comprising:
a marker merger configured to
   receive a returning packet of the first flow from the controller via a packet-out stream, wherein the returning packet corresponds to a packet forwarded to the controller via the packet-in stream, and
   forward the returning packet to an action module for processing according to the flow policy installed on the network device, in response to a determination that second flow-identifying information extracted from the returning packet matches the new transient flow entry having packet-out state.

15. The network device of claim 10, further comprising:
a marker merger configured to
   receive a subsequent packet of the first flow from another network device after the flow policy is installed on the network device, and
   store the subsequent packet in a FIFO (first in first out) buffer, in response to a determination that second flow-identifying information extracted from the subsequent packet matches the new transient flow entry having packet-out state.

16. The network device of claim 10, further comprising:
a marker merger configured to
   receive a returning marker packet for the first flow from the controller via a packet-out stream, wherein the returning marker packet corresponds to the marker packet sent to the controller via the packet-in stream, and the returning marker packet indicates an end to the packet-out stream, and
   flush a set of packets of the first flow from a FIFO (first in first out) buffer to an action module for processing according to the flow policy installed on the network device, in response to a determination that second flow-identifying information extracted from the returning marker packet matches the new transient flow entry having packet-out state, wherein the set of packets were received at the network device after the marker packet was sent to the controller.

17. The network device of claim 16, further comprising:
the marker merger further configured to remove the new transient flow entry in response to receipt of the returning marker packet, wherein
   the marker merger is configured to perform one of
      removal of the new transient flow entry from a transient table, and
      removal of transient status from the new transient flow entry to result in a new non-transient flow entry stored in a flow table.

18. A non-transitory computer readable storage medium configured to store program instructions that, when executed on a processor, are configured to cause the processor to perform a method comprising:
receiving a first packet of a first flow at a network device;
determining whether flow-identifying information extracted from the first packet matches any existing flow entries;
in response to a determination that the flow-identifying information does not match any existing flow entries, generating a new transient flow entry that includes the flow-identifying information and packet-in state, wherein the packet-in state indicates that packets of the first flow are being forwarded to a controller; and forwarding the first packet to the controller via a packet-in stream;

receiving flow policy for the first flow from the controller; and in response to installation of the flow policy on the network device, sending a marker packet to the controller via the packet-in stream, wherein the marker packet indicates an end to the packet-in stream, and updating the new transient flow entry to include packet-out state, wherein the packet-out state indicates that packets of the first flow are no longer being forwarded to the controller.

19. The non-transitory computer readable storage medium of claim 18, the method further comprising:

receiving a subsequent packet of the first flow from another network device after the flow policy has been installed on the network device; and in response to a determination that second flow-identifying information extracted from the subsequent packet matches the new transient flow entry having packet-out state, storing the subsequent packet in a FIFO (first in first out) buffer.

20. The non-transitory computer readable storage medium of claim 18, the method further comprising:

receiving a returning marker packet for the first flow from the controller via a packet-out stream, wherein the returning marker packet corresponds to the marker packet sent to the controller via the packet-in stream, and the returning marker packet indicates an end to the packet-out stream; and in response to a determination that second flow-identifying information extracted from the returning marker packet matches the new transient flow entry having packet-out state, flushing a set of packets of the first flow from a FIFO (first in first out) buffer, wherein the set of packets were subsequently received at the network device after the marker packet was sent to the controller, and processing the set of packets according to the flow policy installed on the network device.

* * * * *